BEAM DEFLECTION

Filed Feb. 21, 1956

INVENTOR.
Donald C. Kaufmann
BY J. C. Whittaker
ATTORNEY

May 5, 1959

D. C. KAUFMANN 2,885,596

BEAM DEFLECTION

Filed Feb. 21, 1956

4 Sheets-Sheet 2

INVENTOR.
Donald C. Kaufmann
BY
J. C. Whittaker
ATTORNEY

May 5, 1959 D. C. KAUFMANN 2,885,596

BEAM DEFLECTION

Filed Feb. 21, 1956 4 Sheets-Sheet 3

INVENTOR.
Donald C. Kaufmann
BY J. L. Whittaker
ATTORNEY

INVENTOR.
Donald C. Kaufmann
BY J. L. Whittaker
ATTORNEY

United States Patent Office 2,885,596
Patented May 5, 1959

2,885,596

BEAM DEFLECTION

Donald C. Kaufmann, Blackwood, N.J., assignor, by mesne assignments, to the United States of America as represented by the Secretary of the Army Application February 21, 1956, Serial No. 566,856

15 Claims. (Cl. 315—24)

The present invention relates to beam deflection methods and circuits. The invention is particularly useful for deflecting the electron beam of a cathode ray tube indicator as, for example, the electron beam of a television display tube.

It is a general object of the present invention to provide an improved method and system for scanning a beam over an area.

It is another object of the invention to provide an improved scanning arrangement for a cathode ray tube indicator which requires a substantially smaller bandwidth for a given resolution than a comparable, sequentially scanned system.

Another object of the invention is to provide an improved arrangement for spirally scanning a beam.

The method of this invention includes the steps of scanning a beam along a first spiral path and then scanning the beam along a second spiral path similar to the first but displaced in position therefrom an amount sufficient to cause the second path to mesh with the first path. In a specific form of the invention, the first path starts at a center position and spirals outwardly. The second path is congruent to the first path and starts in the same position as the first path. However, the second path is rotated with respect to the first path through an angle of 180°, whereby the two paths intermesh with one another.

The invention will be described in greater detail by reference to the following description taken in connection with the accompanying drawings in which.

It can be shown that the upper frequency requirement, and therefore the bandwidth, of any scanning system is a function of $F_t$, the frequency at which a complete picture is scanned, known as the "frame rate." Therefore, if the frame rate can be substantially reduced, the bandwidth requirement of the system can also be reduced. This invention relates to a spirally scanned system having the same resolution as a conventional, sequential, spirally-scanned system and a bandwidth requirement much lower than that of the sequential, spirally-scanned system. The improvement is achieved by scanning the picture area with two intermeshed, spiral fields.

Figure 1:
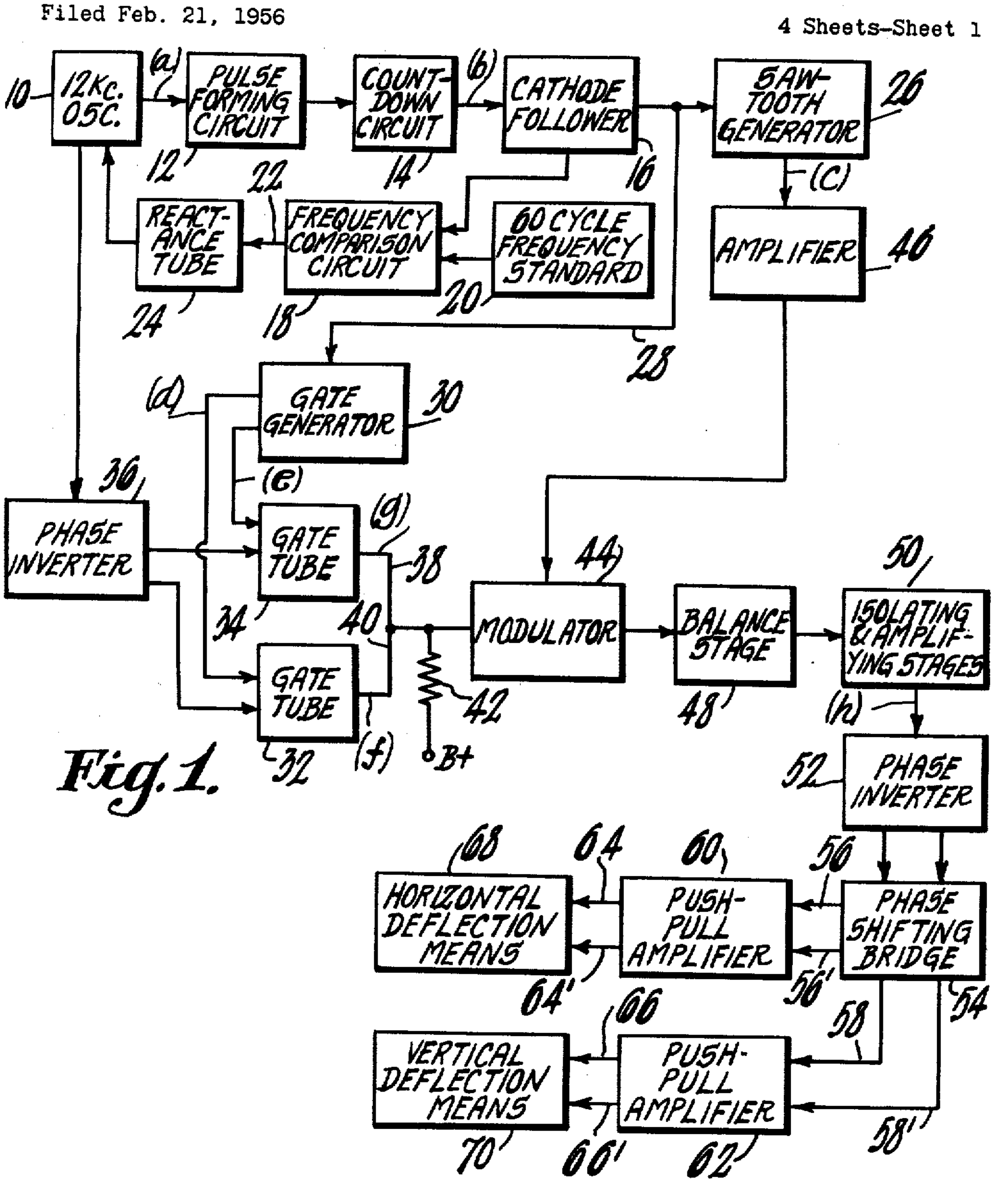
Figure 1 is a block circuit diagram of a preferred form of the present invention.
Figure 2:
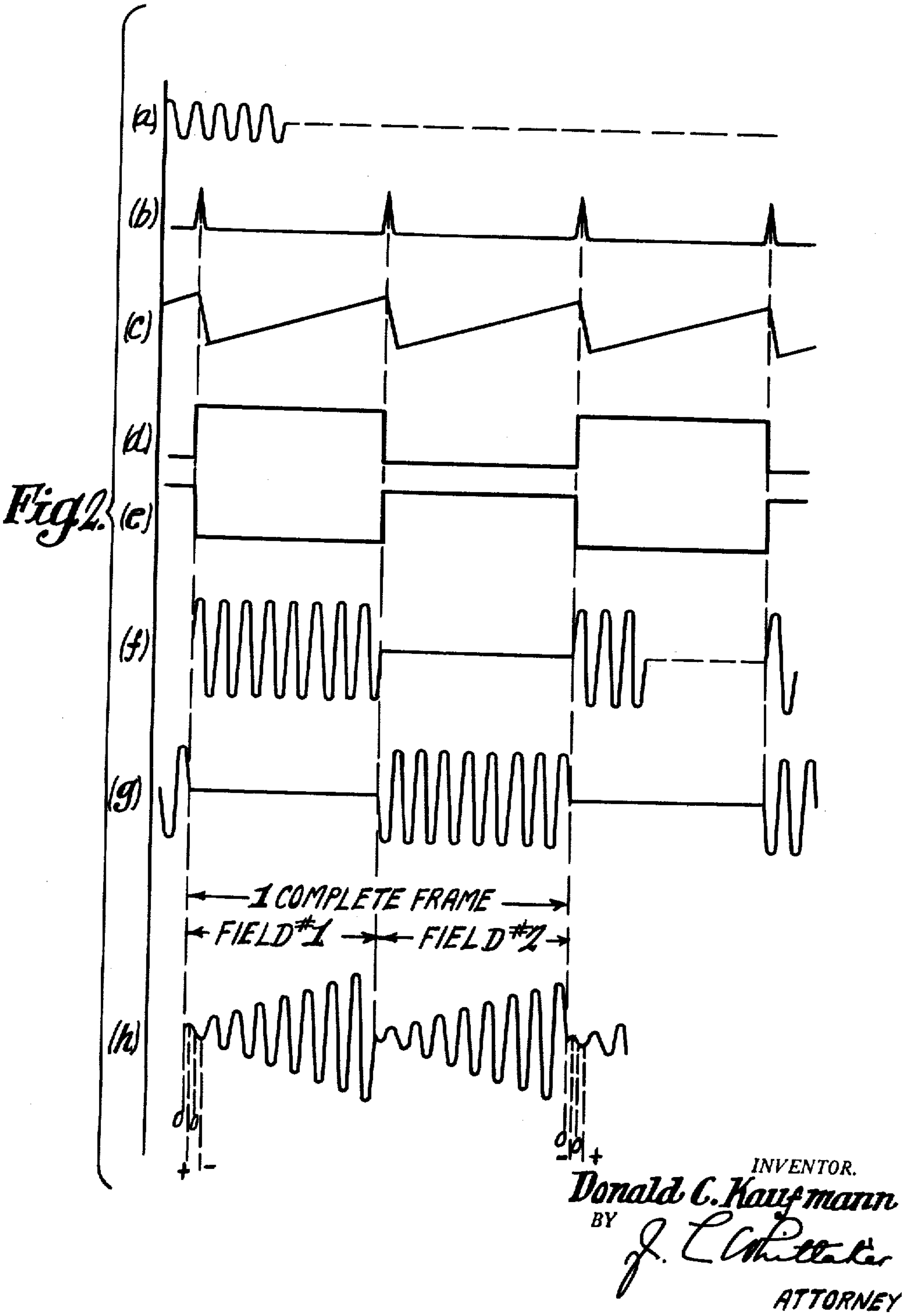
Figure 2 is a drawing of various waveforms present in the circuit of Figure 1.

Referring to Figures 1 and 2, the sinusoidal output *a* of a 12 kilocycle oscillator 10 is converted by a pulse forming circuit 12 to pulses spaced fixed intervals from one another. The pulses are divided by a count-down circuit 14 to produce pulses *b* at a frequency of 60 pulses per second. The counted-down pulses *b* are applied through a cathode-follower stage 16 to a frequency comparison circuit 18. The second input to the frequency comparison circuit consists of a 60 cycle sinusoidal signal from source 20. The frequency comparison circuit may comprise a phase detector of well known type as will be explained more fully below. When oscillator 10 remains on frequency, the pulses applied from cathode follower 16 to the frequency comparison circuit 18 remain at a frequency of 60 cycles, and the control voltage output of the frequency comparison circuit (available at lead 22) is zero volts. However, when the frequency of the oscillator drifts, the two inputs to the frequency comparison circuit are no longer in phase, and a control voltage is developed at lead 22 having a sense and magnitude indicative of the sense and magnitude of the frequency drift of the oscillator. The control voltage is applied to a reactance tube 24 which is effectively connected across one of the tuned circuits of oscillator 10. The reactance tube changes the effective reactance of the aforementioned tuned circuit in the proper sense and in the proper amount to return the oscillator to its preset frequency of 12 kilocycles.

The counted-down pulses *b* are also applied through cathode follower 16 to a sawtooth generator 26. The latter produces sawtooth pulses *c* at a frequency of 60 cycles per second.

Pulses *b* are also applied via lead 28 to gate generator 30. The latter produces gate pulses *d* and *e*, of opposite phase, synchronized with the counted-down pulses *b* and having a frequency of 30 cycles per second. The gate pulses are applied to gate tubes 32 and 34, respectively, and alternately drive the tubes beyond cut-off.

The sinusoidal output of oscillator 10 is applied through phase inverter 36 to the respective input circuits of gate tubes 32 and 34. The output of the phase inverter consists of signals which are 180° out of phase with one another. The outputs of gate tubes 32 and 34 comprise sine waves *f* and *g*. These waves are shown in Figure 2 as if leads 38 and 40 were not connected to a common load resistor 42. In actuality, the voltage across load resistor 42 consists of a continuous sinusoidal wave, one portion of which is in one phase and the following portion of which is a 180° out of phase with the first portion. Each said "portion" of the wave has a duration of 1/60 second. The successive "portions" of the sine wave are in synchronism with the counted-down pulses *b*.

Sawtooth wave *c* and sinusoidal wave *fg* are respectively applied to a modulator 44. Wave *fg* is directly applied to the modulator and wave *c* is applied to the modulator through an amplifier 46. The function of balance stage 48 following modulator 44 is to eliminate the direct current component of the modulator output signal and the function of stage 50 is to isolate and amplify. The resultant wave *h* comprises a sawtooth modulated, sinusoidal signal. One complete frame of the signal requires 1/30 of a second. The frame consists of two fields, each having a duration of 1/60 of a second. As can be seen by closely scrutinizing Figure 2*h*, fields 1 and 2 are congruent, however, field 1 is 180° out of phase with field 2.

Wave *h* is resolved into two components 180° out of phase with one another by phase inverter 52. One of the components is shifted plus 45° and the other minus 45° in phase shifting bridge 54. The resulting signals available at lead 56 are in quadrature with the signals on lead 58. The same holds true for the respective signals on leads 56′ and 58′. The signals on lead 56 are 180° out of phase with those on lead 56′. The same applies to the respective signals on leads 58 and 58′. The foregoing signals, when applied to amplifiers 60 and 62, respectively, result in voltages at leads 64, 64′ and 66, 66′ which are suitable for spirally deflecting the beam of a cathode ray tube indicator. One set of voltages is applied in push-pull to the horizontal deflection means 68 and the other set in push-pull to the vertical deflection means 70.

Figure 3:
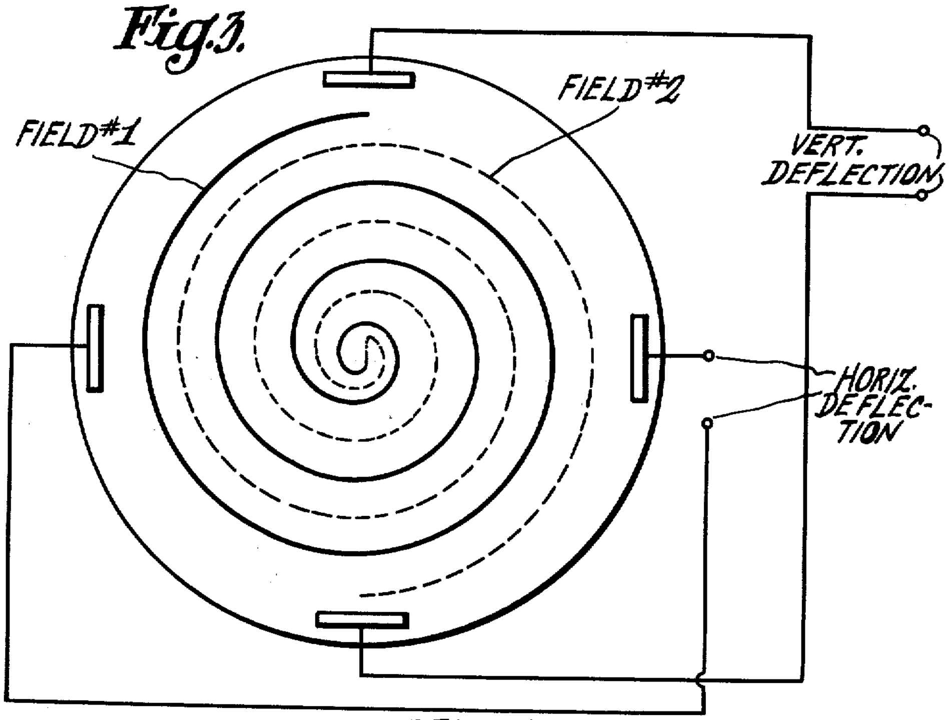
Figure 3 is a sketch of the display of the present invention as it appears on the screen of the cathode ray tube indicator.

Figure 3 is a sketch of an indicator screen showing the paths traced by an electron beam which is deflected in accordance with the voltages mentioned in the preceding paragraph. As already mentioned, one complete frame, which has a duration of 1/30 of a second, consists of two fields. Each field starts at the center of the screen. The first field consists of a spiral path covering a given area, and the second field consists of a spiral path covering substantially the same general area. However, as the two fields are 180° out of phase, the second spiral path is rotated with respect to the first one through an angle of 180°. As a result, the second spiral path intermeshes with the first spiral path.

Figure 4B:
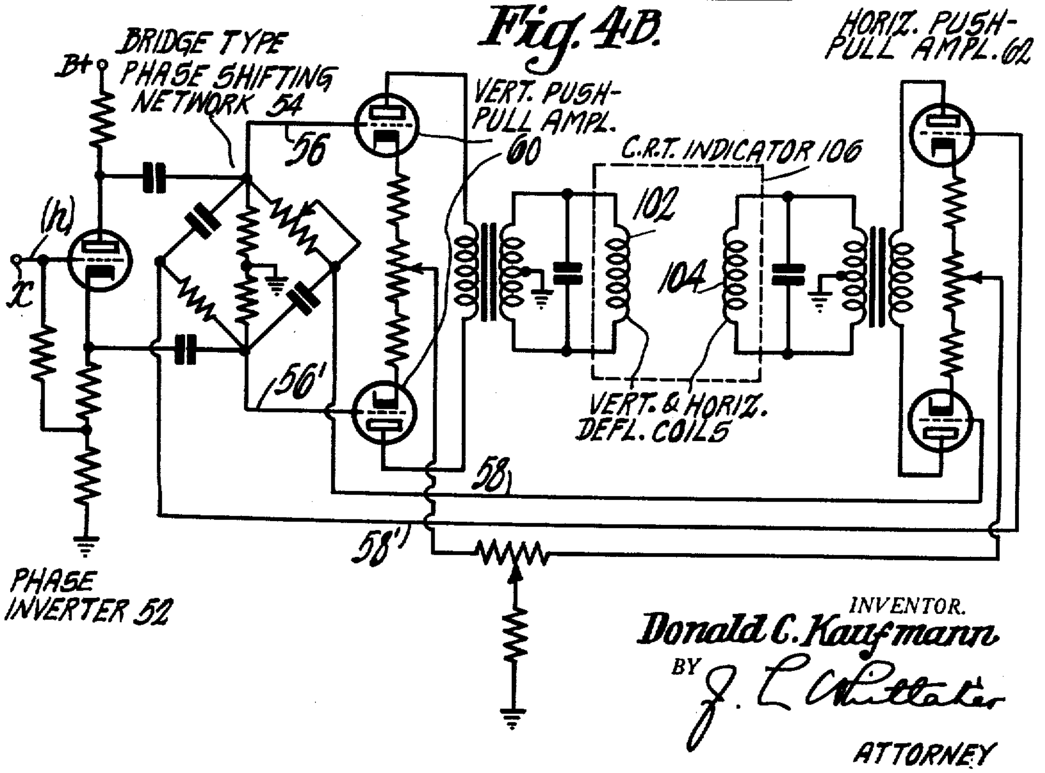
Figures 4*a* and 4*b* together are a schematic circuit diagram of the present invention.
Figure 4A:
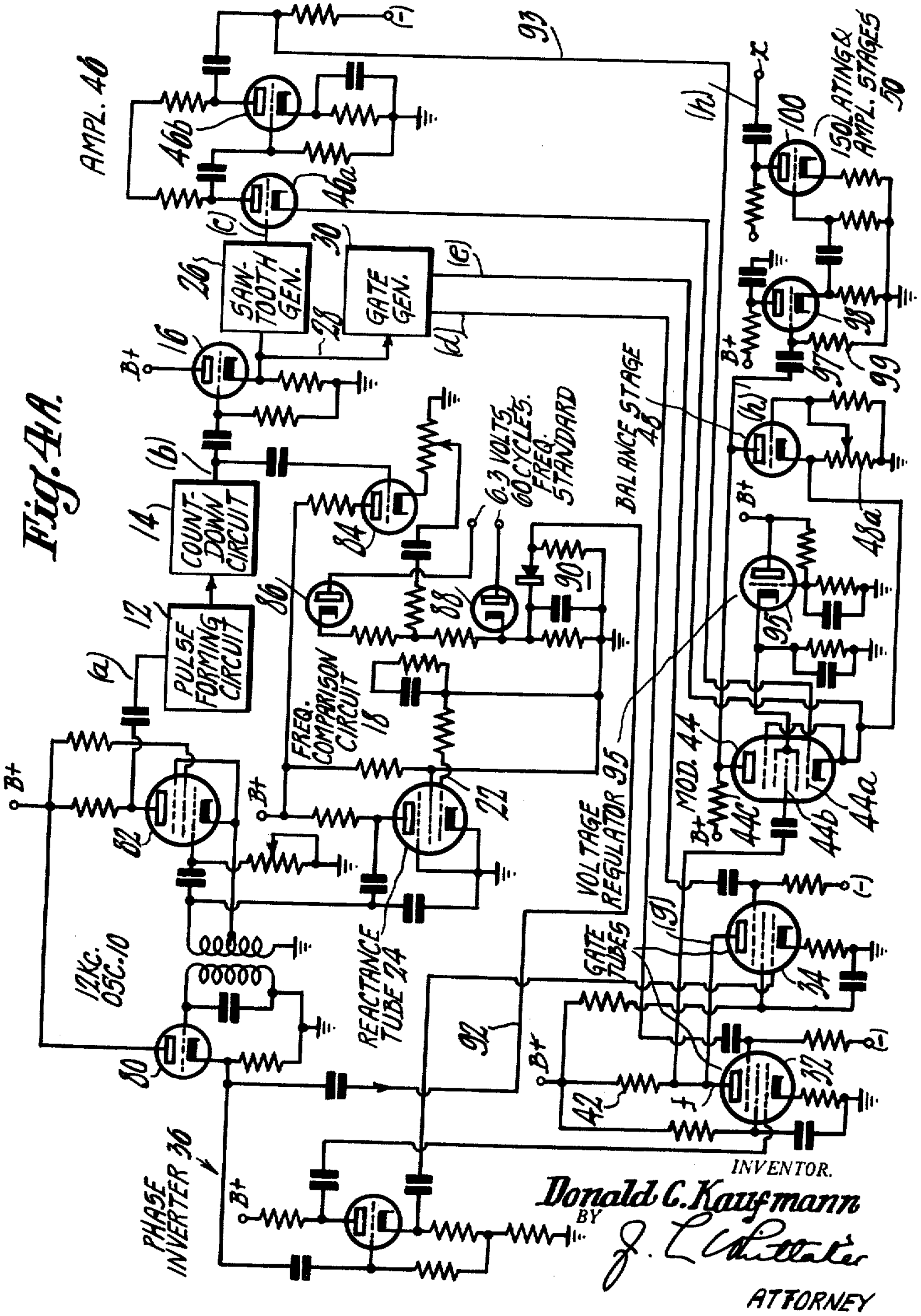

A schematic circuit diagram of a preferred form of the invention is shown in Figures 4*a* and 4*b*. Oscillator 10 includes a triode 80 and pentode 82. This circuit is of conventional design and need not be described in greater detail. Pulse forming circuit 12 and count-down circuit 14 are also conventional. Circuit 12, for example, may include an overdriven amplifier, a differentiating circuit and clipper. Circuit 14 may include a plurality of multivibrator circuits connected in cascade, with pulse formers, and clippers intermediate the respective multivibrators. Other, conventional divider circuits may be employed instead.

Pulses *b* may be applied through a cathode follower 84 to a frequency comparison circuit 18. The latter includes a pair of diodes 86, 88 and a power supply 90 which rectifies a portion of the 12 kilocycle signal applied via lead 92. The rectified voltage is applied to the diodes as a bias voltage. The 60 cycle frequency standard 20 may consist of the ordinary power source. In a practical circuit, the alternating filament supply voltage may be employed as the standard.

Frequency comparison circuit 18 may be initially adjusted so that when the pulses *b* are in a predetermined phase with respect to the 60 cycle sinusoidal signal, zero volts is developed across capacitor 94. If the frequency of oscillator 10 changes, the frequency of pulses *b* will also change a slight amount. This means also that the phase position of pulses *b* will shift with respect to the 60 cycle sinusoidal signal. The phase detector output voltage across capacitor 94 will then change in a sense and in an amount indicative of the direction and extent of the drift of oscillator 10. This signal across capacitor 94, which we may term an error signal, is applied to the control grid of the reactance tube 24, and the impedance reflected by the reactance tube into one of the tuned circuits of oscillator 10 will change. An overall result of the feedback circuit described is that any tendency of the oscillator frequency to drift is compensated, and the oscillator remains substantially on frequency.

Cathode follower 16, sawtooth generator 26, and gate generator 30 are all conventional and their functions have already been described. The sawtooth wave output of generator 26 is applied to the amplifier 46 which will be described in greater detail later.

Gate tubes 32 and 34 comprise a pair of pentodes. Gates *d* and *e* are applied to the suppressor grids of the pentode. The 180° out-of-phase, 12 kilocycle sinusoidal waves are applied to the respective control grids of the pentodes. The pentodes are connected to a common load 42 and the pentode output wave (*f* and *g* combined) appears across the load. This wave is applied to one of the control grids of modulator 44—a pentagrid converter.

Before the application of a sawtooth wave *c* to the control grid of amplifier tube **46*a* tubes 46*a*, 46*b*, 95 and 48 are conductive. However, the bias applied over lead 93 to the first control grid 44*a* of modulator 44 is sufficiently negative to maintain this tube beyond cut-off. In this condition, tubes 46*a* and 46*b*** together comprise a high gain amplifier. When a sawtooth wave *c* is applied to the control grid of amplifier section **46*a*, a greatly amplified sawtooth wave is applied to the first control grid 44*a* of modulator 44. The rapidly rising voltage on this control grid causes the modulator to become conductive shortly after the start of the sawtooth wave. By cathode follower action, the cathode of modulator 44 begins to rise as soon as the modulator starts to conduct. This causes the cathode of amplifier section 46*a*, to which it is directly coupled, also to rise, reducing the gain of amplifier section 46*a*. In this condition, amplifier 46*a*, 46*b* comprises a unity gain amplifier. The net result of the above-described action is that the cathode current of modulator 44 follows the sawtooth waveform applied to the control grid of amplifier section 46*a***.

The action of the third grid **44*b*** of the pentagrid converter is to divide the cathode current between the plate and screen. This division of current is nearly constant over a wide range of cathode current so that if a sine wave is applied to the third grid, and a sawtooth is applied to the first grid, the plate current will consist of a sine wave superimposed on a sawtooth wave.

The function of balance stage 48 is to eliminate the direct current component of the sawtooth modulated wave to obtain an undistorted symmetrical wave. If the cathode of the modulator 44 rises, the cathode of balance stage 48, to which it is directly coupled, also rises. The voltage on the control grid of stage 48 is obtained from its cathode resistance, and although it varies in a manner similar to that of the cathode of modulator 44, its amplitude can be controlled by the potentiometer **48*a*. In any position of this potentiometer the signal on the control grid of stage 48 is less than that at the cathode of modulator 44, so that the cathode current of stage 48 is reduced as the cathode current of stage 44 is increased. By proper adjustment of potentiometer 48*a*, the sawtooth component of the current through anode load resistor 44*c* of tube 44** can be reduced to zero, giving a balanced resultant sawtooth-modulated, sinusoidal signal.

It might seem at first glance that the elimination of the direct-current sawtooth component across resistor **44*c* would mean the elimination of the sawtooth current through potentiometer 48*a*, which, if it were the case, would prevent the proper operation of the circuit. However, the screen current of tube 44 adds to its plate current, giving a rise to the sawtooth wave through potentiometer 48*a* and providing a signal for balance stage 48. Misadjustment of potentiometer 48*a* can cause either a positive or negative sawtooth component in the output of the modulator stage 44**.

In practice it is difficult to obtain complete cancellation of the direct current component of the sawtooth wave. However, if the sawtooth repetition rate and the sine wave which it modulates are sufficiently different in frequency (which is the case in the present circuit), a high pass filter at the output of modulator stage 44 will substantially improve the resultant waveform. Capacitor 97 and resistor 99 constitute such a filter.

Voltage regulator 95 is included in the circuit to provide a constant voltage at the screen of modulator 44. It is not essential to the operation of the circuit.

In operation, the circuit described in the immediately preceding paragraphs (with high pass filter included), has been found to be relatively insensitive to values of bias and adjustment of potentiometer **48*a***. The output waveform has been found to be excellent over a wide range of these variables. An important advantage of this circuit over other modulator circuits is that the waveform always starts from zero amplitude.

The sawtooth modulated sine wave output of filters 97, 99 is applied through an isolating cathode follower 98 and amplifier 100 to phase inverter 52 (see Figure 4*b*, terminal *x*). The two outputs of the phase inverter are applied through a bridge-type, phase-shifting network 54 to the vertical and horizontal push-pull amplifiers 60 and 62, respectively. The outputs of the push-pull amplifiers are applied to the vertical and horizontal deflection coils 102 and 104, respectively of the cathode ray tube indicator 106 (shown as a dashed block). (It will be understood that the invention is equally applicable to the electrostatic deflection of a cathode ray tube beam, as indicated schematically in Figure 3.) The resultant sawtooth currents through the deflection coils produce an interlaced spiral scan, as shown schematically in Figure 3.

What is claimed is:

1. Apparatus for scanning a beam over an area perpendicular to the quiescent position of the beam comprising beam deflection means, first means coupled to said beam deflection means for spirally deflecting the beam to intersect the area along a first spiral path, and second means coupled to said beam deflection means for spirally deflecting the beam to intersect the area along a second spiral path congruent with the first spiral path but rotated with respect thereto through an angle of 180°.

2. Apparatus for scanning the electron beam of a cathode ray tube indicator over the screen of the indicator comprising beam deflecting means, first means coupled to said beam deflecting means for spirally deflecting the beam outwardly from its quiescent position to intersect the screen along a first spiral path, and second means coupled to said beam deflecting means for spirally deflecting the beam outwardly from its quiescent position to intersect the screen along a second spiral path substantially congruent with the first spiral path but rotated with respect thereto through an angle of greater than 0° and less than 360°.

3. Apparatus as set forth in claim 2, wherein said angle is 180°.

4. In combination, means for generating a first sawtooth-modulated, sinusoidal wave; means for generating a second sawtooth-modulated, sinusoidal wave similar to the first wave but with the sinusoidal component of the wave shifted in phase 180° with respect to the sinusoidal component of the first wave; cathode ray tube indicator means including beam deflection means responsive to a sawtooth-modulated, sinusoidal wave for spirally deflecting the cathode ray beam thereof; and means for successively applying said first and second waves to said deflecting means.

5. In combination, connections for a source of stable sinusoidal signal; means coupled to said connections for deriving from said signal pulses at a frequency which is sub-harmonically related to the frequency of said signal; and means responsive to said pulses for periodically inverting the phase of said sinusoidal signal to produce a resultant sinusoidal signal successive portions of which are 180° out of phase with one another.

6. In combination, connections for a source of stable sinusoidal signal; means coupled to said connections for deriving from said signal pulses at a frequency which is sub-harmonically related to the frequency of said signal; means responsive to said pulses for periodically inverting the phase of said sinusoidal signal to produce a resultant sinusoidal signal successive portions of which are 180° out of phase with one another; sawtooth generator means responsive to said pulses for producing a sawtooth wave in synchronism with said pulses; and means connected to receive said resultant sinusoidal signal and said sawtooth wave for sawtooth modulating said resultant sinusoidal signal with said sawtooth wave.

7. In the combination as set forth in claim 6, said means connected to receive said resultant sinusoidal signal and said sawtooth wave comprising a pentagrid converter discharge device having two control grids, said resultant sinusoidal signal being applied to one of said control grids and said sawtooth wave to the other of said control grids.

8. In the combination as set forth in claim 6, further including a cathode ray tube indicator having horizontal and vertical beam deflection means; means for shifting the phase of the sinusoidal component of said sawtooth modulated sinusoidal signal 90°; means for applying the unshifted sawtooth modulated sawtooth signal to one of said deflection means; and means for applying said 90° phase shifted sawtooth modulated signal to the other of said deflection means.

9. In combination, means for generating a first sawtooth modulated sinusoidal wave; means for generating a second sawtooth modulated sinusoidal wave similar to the first wave but with the sinusoidal component of the wave shifted in phase 180° with respect to the sinusoidal component of the first wave; cathode ray tube indicator means including a pair of orthogonally related beam deflection means; means for applying said first wave followed by said second wave to one of said deflection means; a 90° phase shifter means; and means for applying said first wave followed by said second wave through said 90° phase shifter means to the other of said deflection means.

10. In combination, means for generating a deflection voltage consisting of a sawtooth modulated sine wave followed by a sawtooth modulated sine wave of the same frequency but shifted in phase an angle greater than zero degrees and less than 360°; cathode ray tube indicator means including a pair of orthogonally related electron beam deflection means; a 90° phase shifter; and means for applying said deflection voltage directly to one of said deflection means and through said phase shifter to the other of said deflection means.

11. In combination, means for generating a deflection voltage consisting of a linearly-increasing, sawtooth-modulated sine wave followed by a similarly modulated sine wave of the same frequency but shifted in phase an angle greater than 0° and less than 360°; cathode ray tube indicator means including a pair of orthogonally related electron beam deflection means; a 90° phase shifter; and means for applying said deflection voltage directly to one of said deflection means and through said phase shifter to the other of said deflection means.

12. In combination, means for generating a deflection voltage consisting of a linearly-increasing, sawtooth-modulated sine wave immediately followed by a similarly modulated sine wave of the same frequency but shifted in phase 180°; cathode ray tube indicator means including a pair of orthogonally related electron beam deflection means; a 90° phase shifter; and means for applying said deflection voltage directly to one of said deflection means and through said phase shifter to the other of said deflection means.

13. In combination, a source of sinusoidal signal; means connected to said source for deriving therefrom a first wave in phase with said sinusoidal signal and a second wave 180° out of phase therewith; a pair of amplifier means each having an input circuit; means applying said first wave to the input circuit of one of said amplifier means and said second wave to the input circuit of the other of said amplifier means; a load circuit common to both amplifier means; and means for alternately driving said amplifier means to cut off for predetermined intervals of time.

14. In the combination as set forth in claim 13, said means for alternately driving said amplifier means to cut off comprising a square wave.

15. In the combination as set forth in claim 14, further including means for producing a sawtooth wave at a frequency double that of the square wave and synchronous with the square wave; and modulator means receptive of said sawtooth wave and the wave at said common load circuit for producing a sawtooth modulated sine wave.

References Cited in the file of this patent

UNITED STATES PATENTS

| | | |
|---|---|---|
| 2,552,437 | Korman | May 8, 1951 |
| 2,677,785 | Owen | May 4, 1954 |
| 2,717,329 | Jones | Sept. 5, 1955 |